(No Model.) 2 Sheets—Sheet 1.

C. W. HUNT.
CAR TRUCK.

No. 461,680. Patented Oct. 20, 1891.

Witnesses
Chas. H. Smith
J. Staib

Inventor
Charles W. Hunt
per Lemuel W. Serrell
atty (No Model.) 2 Sheets—Sheet 2.

C. W. HUNT.
CAR TRUCK.

No. 461,680. Patented Oct. 20, 1891.

Witnesses
Chas. H. Smith
J. Staib

Inventor
Charles W. Hunt
per Lemuel W. Serrell
Atty

UNITED STATES PATENT OFFICE.

CHARLES W. HUNT, OF WEST NEW BRIGHTON, NEW YORK.

CAR-TRUCK.

SPECIFICATION forming part of Letters Patent No. 461,680, dated October 20, 1891.

Application filed February 16, 1891. Serial No. 381,599. (No model.)

*To all whom it may concern:*

Be it known that I, CHARLES W. HUNT, a citizen of the United States, residing at West New Brighton, in the county of Richmond and State of New York, have invented an Improvement in Car-Trucks, of which the following is a specification.

In my patents, No. 256,571, granted April 18, 1882, and No. 347,936, granted August 24, 1886, the car-axle is movable into an inclined position to the car-frame, and there are king-bolts or central pivots upon which the parts swing.

In my present improvement I dispense with the king-bolt or central pivot and connect the respective axle-boxes in such a manner that a movement on one axle-box in one direction insures a corresponding movement of the other axle-box in the other direction. Hence the axle-boxes and axle are properly held in relation to the car or truck frame and to the supports for the same; but the axle can move to the diagonal position properly required for the wheels to travel upon a curved track or back to the normal position for a straight track.

Figure 2:
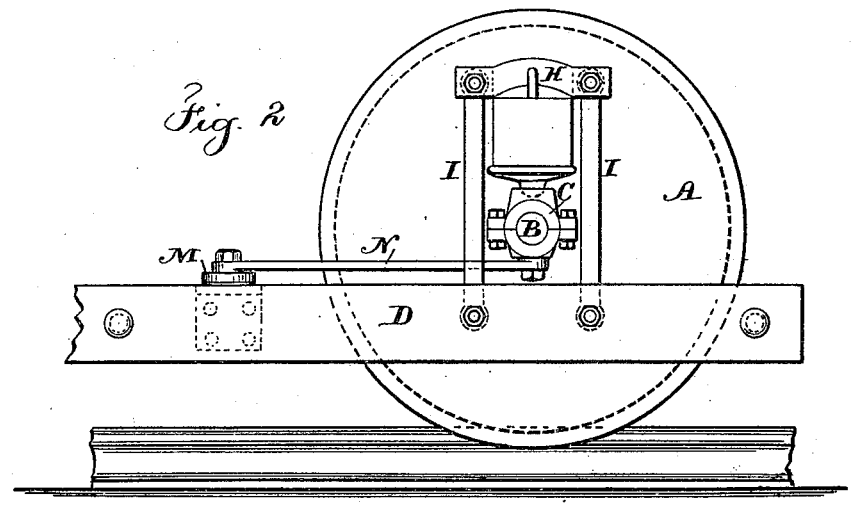
Figure 1:
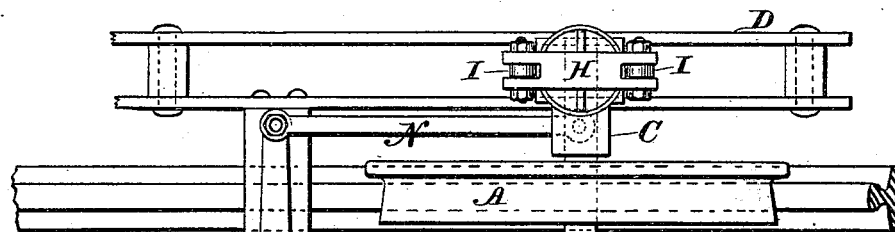
Figure 1:
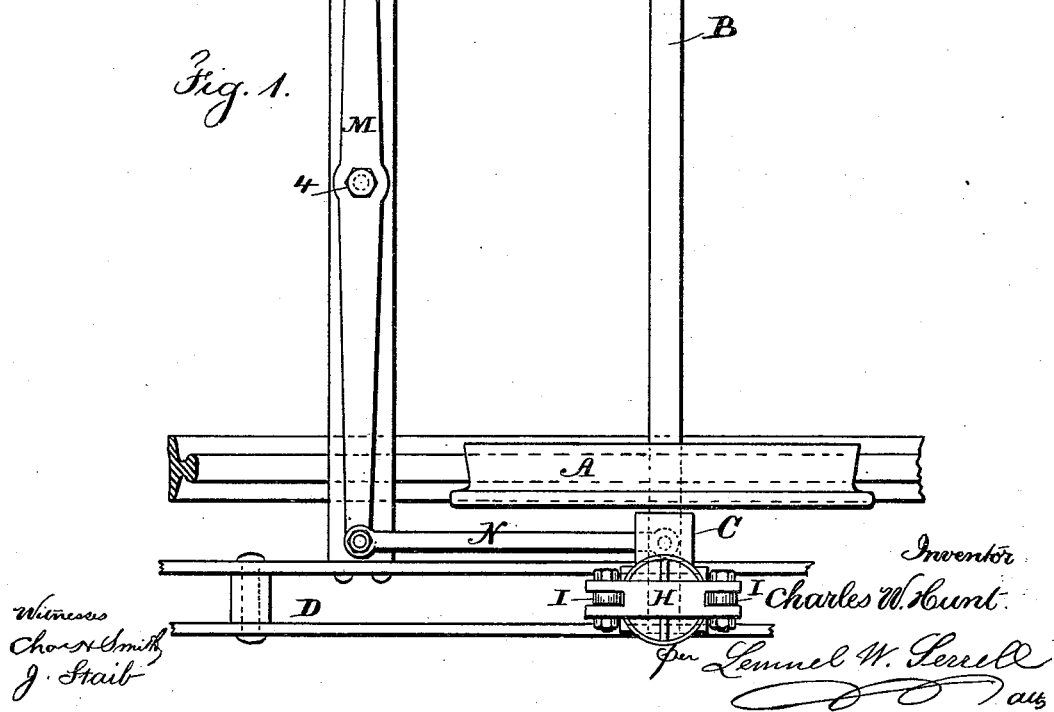
Figure 4:
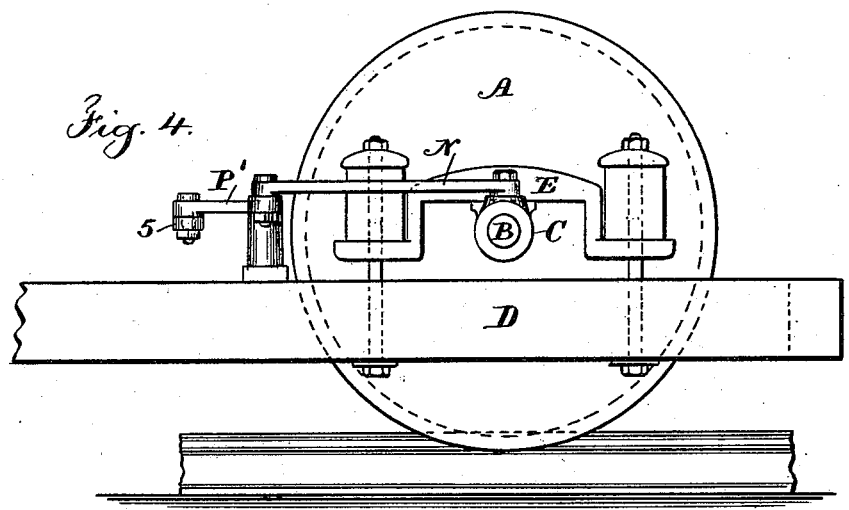
Figure 3:
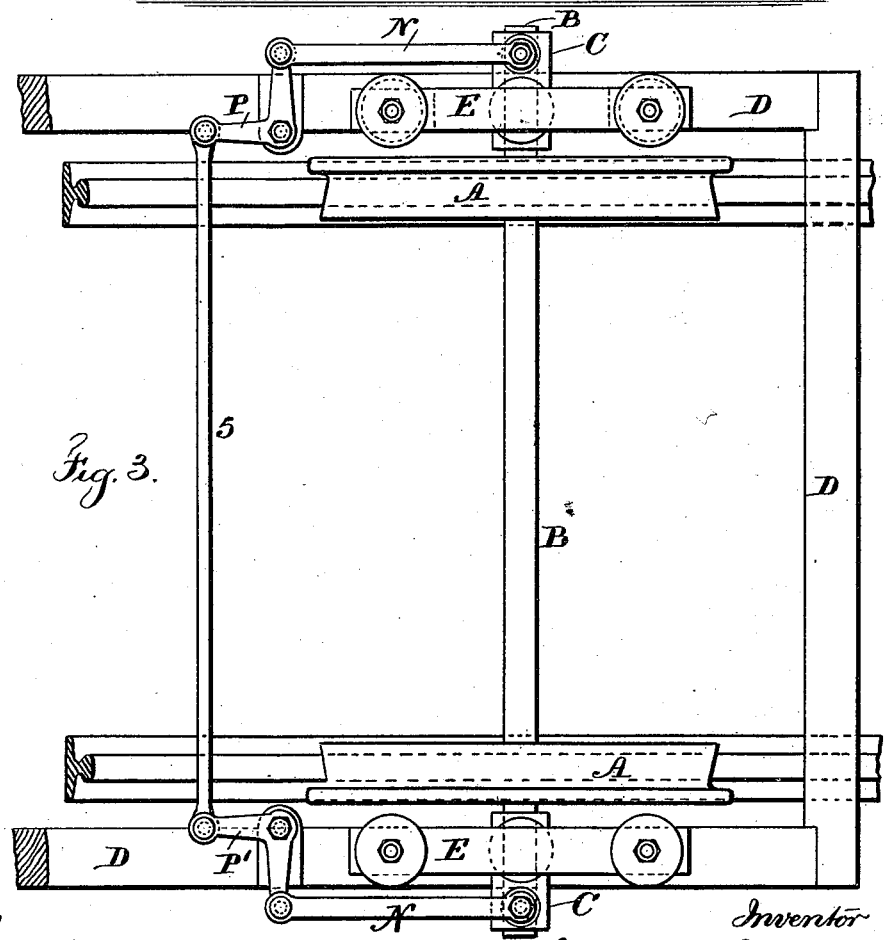

In the drawings, Figure 1 is a plan view illustrating my present improvements, and Fig. 2 is an elevation of the same; and Fig. 3 is a plan view, and Fig. 4 an elevation, of a modification of the axle-box connection.

The wheels A A are upon the axle B, and the axle-boxes C may be inside between the wheels A A, as in my aforesaid patents, or outside of the wheels, as represented herein, and these axle-boxes may slide in suitable bearings either below the frame D or beneath the bearing-bars E, and springs may be provided above such bearing-bars, as in my patent, No. 256,571, or in place of the axle-boxes sliding they may be suspended by links I and cross-bearers H, as in my patent, No. 347,936, and as illustrated in Figs. 1 and 2. The axle-boxes C are connected the one to the other by links N and levers. Where it is convenient to place the lever M parallel with the axle and pivoted upon the frame at 4, such links N may be pivoted directly to the ends of the lever M and to the axle-boxes, as shown in Figs. 1 and 2; but where the construction of the car or truck frame is such that it is not convenient to have a central pivot 4 two bent levers may be substituted for the lever M, as represented by the bell-crank levers P P', Figs. 3 and 4, and these are connected by a rod 5. Under all circumstances the pivot or pivots of the lever or levers, being rigid and upon the car-frame, become connections from the respective axle-boxes to such frame through the intervention of the links N, and the lateral strain upon the axle and axle-boxes is by this means transferred to the car or truck frame; but when the wheels A run upon a curve the flange of the inner wheel, striking the inner rail of the curve, produces a slight detention of that wheel, and the flange of the outer wheel usually runs upon an outer rail, and these cause a movement of both axle-boxes through the intervening levers and links, so that the axle promply assumes the proper radial position to the curved track over which the car or truck is traveling, and in like manner in passing from a curved to a straight track the axle is brought back to its normal position.

I claim as my invention—

1. The combination, with the pair of car-wheels and their axles and boxes, of links connected with the boxes and a lever or levers pivoted upon the truck or car frame and to which the links are connected for allowing the boxes to move equally in opposite directions, substantially as set forth.

2. The combination, with the car-wheels, axle, and axle-boxes, of bent levers pivoted to the car or truck frame, links connected to the axle-boxes and levers, respectively, and a link connecting one bent lever to the other, substantially as set forth.

3. The combination, with the wheels having outside flanges and conical treads, their axle and axle-boxes, of frames and supports outside of the wheels for the axle-boxes, and connections from the frames to the axle-boxes, a lever pivoted on the frame and connections therefrom to the axle-boxes, substantially as set forth.

Signed by me this 12th day of February, 1891.

CHAS. W. HUNT.

Witnesses:
GEO. T. PINCKNEY,
WILLIAM G. MOTT.